United States Patent [19]

Wegner et al.

[11] Patent Number: 5,035,762
[45] Date of Patent: Jul. 30, 1991

[54] PRODUCTION OF THIN FILMS

[75] Inventors: Gerhard Wegner, Mainz-Drais, Fed. Rep. of Germany; Arend J. Schouten, Peize, Netherlands; Gisela Duda, Mainz; Thomas Arndt, Ingelheim, both of Fed. Rep. of Germany

[73] Assignee: BASF Aktiengesellschaft, Ludwigshafen, Fed. Rep. of Germany

[21] Appl. No.: 223,017

[22] Filed: Jul. 22, 1988

[30] Foreign Application Priority Data

Jul. 24, 1987 [DE] Fed. Rep. of Germany ....... 3724543

[51] Int. Cl.$^5$ ............................................. B32B 31/04
[52] U.S. Cl. ................................... 156/230; 156/246; 156/249; 156/306.3; 264/298; 427/434.3
[58] Field of Search ............... 156/230, 231, 249, 245, 156/246, 306.3; 427/58, 402, 407.1, 434.3, 434.4, 434.5; 264/298, 212

[56] References Cited

U.S. PATENT DOCUMENTS 3,551,244 12/1970 Forester et al. ...................... 264/298
3,933,561 1/1976 Larson et al. ........................ 156/249
4,716,851 1/1988 Saito et al. ........................ 427/434.4
4,794,045 12/1988 Robin et al. ...................... 427/434.4

FOREIGN PATENT DOCUMENTS 6500089 7/1965 Netherlands .

OTHER PUBLICATIONS

C. S. Winter et al., Thin Solid Films 134, 1985s. 49ff.
H. Nakahara et al., Thin Solid Films 133, 1985, s. 29ff.
Ikeda et al., Bull. Chem. Soc., Japan, 34, 1961, S. 416ff.
F. Takeda et al., J. Coll. Int. Sci. 84, Sci. 84, No. 1, 1981, S. 220ff.
K. Watamabe, Y. Fukuda, R. Gehani & J. Nematyu, Macromolecules 17, 1984, S. 104ff.
G. L. Gaines, Insoluble Monolayers et Liquid–Gas–Interfaces, Interscience Publishers, 1966.
W. E. Goode et al., J. Pol. Sci. 46, 317, 1969, 47, 75.
J. L. Houben, A. Fissi, D. Baccrola, N. Rosato & O. Pieroni, F. Ciardelli, Int. J. Biol. Macromol. 5, 94, 1983.
S. J. Mumby et al., Macromolecules 19, 1986, S. 1054ff.

*Primary Examiner*—Caleb Weston
*Attorney, Agent, or Firm*—Keil & Weinkauf

[57] ABSTRACT

Thin films are produced by a process in which organic polymers having long-chain side groups are dissolved in an organic solvent, the solution is spread at the water-/air interface by the Langmuir-Blodgett technique and the film is transferred onto a solid base material after evaporation of the organic solvent, and the organic polymers used are those which contain long-chain n-alkyl side groups bonded to the main chain of the polymer via polar groups, and some of these long-chain n-alkyl side groups are replaced by shorter-chain n-alkyl side groups, by branched alkyl side groups having the same or a smaller number of carbon atoms or by equally long or shorter side groups having one or more C-C multiple bonds.

This process can be used to produce film elements, for example for optical filters.

13 Claims, No Drawings

PRODUCTION OF THIN FILMS

The present invention relates to a process for the production of thin films of organic polymers having long-chain side groups on a solid base material by the Langmuir-Blodgett technique, and film elements produced by this process.

The production of monolayers of organic polymers having long-chain side groups by the Langmuir-Blodgett technique is known. For example, C. S. Winter et al. (Thin Solid Films 134 (1985), 49 et seq) investigated Langmuir-Blodgett films of derivatives of octadec-1-ene/maleic anhydride copolymers, polyoctadecyl acrylate and polyoctadecyl methacrylate. Furthermore, S. J. Mumby et al. (Macromolecules 19 (1986), 1054 et seq) studied Langmuir-Blodgett films of the two last-mentioned polymers. A maximum of 6 Z layers with a constant transfer ratio are mentioned here.

H. Nakahara et al. (Thin Solid Films 133 (1985), 29 et seq) investigated the effect of side chain length and main chain rigidity on transfer in the case of cellulose ester, octadecene/maleic anhydride copolymers and their derivatives.

Monomers of poly-γ-benzyl L-glutamate and poly-β-benzyl L-aspartate (S. Ikeda and T. Isemura, Bull. Chem. Soc. Jpn. 34 (1961), 416 et seq) and monolayers of poly-γ-methyl L-glutamate (F. Takeda et al., J. Coll. Int. Sci. 87 (1981), 220 et seq) have also been investigated.

It is an object of the present invention to provide a process for the production of thin films of organic polymers having long-chain side groups by the Langmuir-Blodgett technique, the said process to constitute an improvement with respect to the transferability of the monolayers and to have a constant transfer ratio so that better reproducibility is ensured.

We have found that this object is achieved, surprisingly, by the use of organic polymers which contain long-chain n-alkyl side groups bonded to the main chain of the polymer exclusively via polar groups, some of these long-chain n-alkyl side groups being replaced by shorter-chain n-alkyl side groups, by branched carbon radicals or by carbon radicals containing C—C multiple bonds. They are therefore comb polymers having different side groups in the same molecule.

The present invention relates to a process for the production of thin films of organic polymers having long-chain side groups on a solid base material, the organic polymer being dissolved in an organic solvent, the solution being spread at the water/air interface by the Langmuir-Blodgett technique and the film being transferred to a solid base material after evaporation of the organic solvent, wherein organic polymers which contain long-chain n-alkyl side groups bonded to the main chain of the polymer exclusively via polar groups are used as the organic polymers having long-chain side groups, with the proviso that some of these long-chain n-alkyl side groups are replaced by shorter-chain n-alkyl side groups, by branched alkyl side groups having the same or a smaller number of carbon atoms and/or by equally long or shorter side groups having one or more C—C multiple bonds.

Preferred polar groups are —O—,

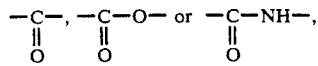

in particular

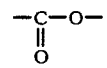

Both copolymers and polycondensates can be used as organic polymers having long-chain side groups.

The novel process is distinguished both by improved transferability of the monolayers and a constant deposition ratio and better reproducibility.

The present invention also relates to film elements which have been produced by the novel process.

The process according to the invention is suitable, for example, for the production of filters for optical purposes, for improving the frictional properties of materials, for the production of protective layers and other relevant uses.

The base material to be used for the novel process can, if required, be rendered hydrophobic before the application of the copolymer monolayers. Where corresponding copolycondensate monolayers are applied, it is advantageous to render the base material hydrophobic.

Regarding the novel process and the components of the polymers, the following may be stated specifically.

Examples of copolymers are:

polyvinyl alkyl ethers where the n-alkyl chain is of 12 to 36 carbon atoms, such as polyvinyl octadecyl ether, some of whose straight-chain octadecyl groups may be replaced by, for example, hexadecyl, dodecyl, decyl, nonyl, octyl, hexyl, n-butyl or isobutyl groups; corresponding copolymers of polyvinyl alkyl ketones of different chain lengths;

poly-N-alkylacrylamides or poly-N-alkylmethacrylamides, where the long-chain n-alkyl groups may contain 12 to 36 carbon atoms and are partially replaced by n-alkyl radicals having a smaller chain length or branched alkyl radicals;

polymeric esters of acrylic acid, methacrylic acid or other copolymerizable α,β-ethylenically unsaturated monocarboxylic acids having straight-chain alkyl groups of not less than 12, preferably 16 to 36, carbon atoms, some of these long-chain n-alkyl groups being replaced by n-alkyl groups having an alkyl radical which is shorter by one or more, preferably 2 to 8, carbon atoms, or being replaced by branched alkyl groups having the same or a smaller number of carbon atoms in the alkyl radical or by hydrocarbon radicals having the same or a smaller number of carbon atoms, these hydrocarbon radicals containing one or more C—C multiple bonds, for example —HC=CH— or —C≡C— groups; C—C multiple bonds can advantageously be introduced by polymer-analogous reaction.

Examples of long-chain n-alkyl (meth)acrylates (a) are docosyl (meth)acrylate, eicosyl (meth)acrylate, octadecyl (meth)acrylate, hexadecyl (meth)acrylate, tetradecyl (meth)acrylate and dodecyl (meth)acrylate.

In the copolymers to be used according to the invention, some of the long-chain n-alkyl (meth)acrylates of this type are replaced by n-alkyl (meth)acrylates having shorter n-alkyl radicals, by those having branched alkyl radicals or by those having C—C multiple bonds.

The proportion of the components (a) and (b) as copolymerized units of the copolymer can vary within wide limits and is in general 50 to 99.5 mol % for component (a) and from 0.5 to 50 mol % for component (b).

Preferred copolymers are those which contain from 80 to 99.5, in particular from 85 to 99, mol % of component (a) and from 0.5 to 20, in particular from 1 to 15, mol % of component (b).

Copolymers of octadecyl (meth)acrylate with hexadecyl (meth)acrylate, dodecyl (meth)acrylate, decyl (meth)acrylate, nonyl (meth)acrylate, octyl or isooctyl (meth)acrylate, hexyl (meth)acrylate, butyl (meth)acrylate or methyl (meth)acrylate are particularly suitable.

Thus, these are copolymers in which the amount of the modifying comonomer (b) may vary depending on its chain length.

(Meth)acrylate copolymers are preferred.

The copolymers to be used according to the invention generally have degrees of polymerization of from 10 to 200. Isotactic copolymers are preferred.

Examples of suitable polycondensates having different side chains are polyesters and, in particular, polyamides. Regarding the choice and combination of the side chains, the statements made in connection with the copolymers are essentially applicable. Among the polyamides, the polyglutamates which contain different ester groups in the $\gamma$-position should be mentioned in particular. Poly($\gamma$-octadecyl L-glutamates) where some, e.g. 2–20 mol %, of the octadecyl groups are replaced by n-alkyl groups of less than 18, preferably 1 to 16, carbon atoms or corresponding branched alkyl radicals or hydrocarbon radicals having C—C multiple bonds are preferred.

Examples of such polycondensates are poly($\gamma$-methyl-L-glutamate-co-$\gamma$-octadecyl-L-glutamate). Such cocondensates can be prepared by polymer-analogous reaction of the polymeric homocondensates, for example by partial transesterification of the poly-$\gamma$-methyl L-glutamate with stearyl alcohol (cf. J. Watanabe, Y. Fukuda, R. Gehani and I. Nematyn, Macromolecules 17 (1984), 1004 et seq).

The Langmuir-Blodgett technique, the apparatuses which are suitable for this purpose and the preconditions for carrying out this method are known and are described in, for example, G. L. Gaines, Insoluble Monolayers at Liquid-Gas Interfaces, Interscience Publishers, 1966; in particular, reference may be made to pages 44–68, 336–340 and 326–330 of this monograph.

The transfer of monolayers is generally effected in the liquid-analogous state.

The organic polymers are advantageously dissolved in readily volatile organic solvents, such as methylene chloride, chloroform, benzene, hexane or ethyl acetate, in concentrations of about 0.01–1% by weight, the solvent is evaporated off from the polymer solution applied to the water surface, and the monolayer is precompressed in a conventional manner before transfer onto solid base materials.

In general, temperatures of 5° to 35° C., preferably from 10° to 30° C., are employed.

Suitable base materials for the novel film elements, on which the thin, ordered films of well defined structure consisting of organic polymers are applied, are any solid, preferably dimensionally stable substrates of a very wide range of materials. The substrates serving as the base material may be, for example, transparent or translucent, electrically conductive or insulating. The surface of the substrate on which the thin film of the organic polymers is applied may be rendered hydrophobic. The substrate may consist of a hydrophobic material or the surface of the substrate can be rendered hydrophobic before application of the thin film of the organic polymer in a conventional manner by a suitable pretreatment. The hydrophobic substrate surface to be coated should be very clean so that the formation of a thin, ordered film, in particular a monomolecular or multimolecular layer structure, is not disturbed. For example, the presence of surfactants on the substrate surface to be coated can adversely affect formation of a good monomolecular or multimolecular film. However, it is possible for the substrates serving as the base material to be provided, on the surface to be coated, initially with an intermediate film prior to application of the thin films of the organic polymer, for example in order to achieve good adhesion between the solid, thin film of the organic polymer and the substrate.

Examples of suitable materials for the substrates serving as the base material are metals, such as gold, platinum, nickel, palladium, aluminum, chromium, niobium, tantalum, titanium, steel and the like. Other suitable materials for the substrates included plastics, such as polyesters, e.g. polyethylene terephthalate or polybutylene terephthalate, polyvinyl chloride, polyvinylidene chloride, polytetrafluoroethylene, etc.

Examples of other suitable materials for the substrates are silicon, glass, silica, ceramic materials and cellulose products. The surface of glass substrates can, if required, be rendered hydrophobic in a known manner, for example by reaction with alkylsilanes. The choice of the substrate materials depends mainly on the intended use of the novel film element. For optical elements, as a rule transparent or translucent substrates are used as the base material. If the novel film elements are used, for example, in the electrical industry or in electrochemical processes, in particular electrically conductive materials, such as metals, or materials having electrically conductive, in particular metallic, surface layers, for example metallized plastic films, serve as substrates.

The substrates serving as the base material for the novel film elements may have any shape, depending on the intended use. For example, they may be film-like, foil-like, sheet-like, band-like or cylindrical or may be selected from any other shapes. In general, the base materials are flat, even substrates, such as film, foils, sheets, bands, metal sheets and the like. The substrate surface to be coated is preferably smooth, as is usual for the production of thin ordered films having a well defined structure, in particular monomolecular films or multimolecular films. In the case of the flat even substrates, such as films, foils, bands, etc., the novel thin ordered films of well defined structure and consisting of the organic polymers may be applied to one or both surfaces of the substrate.

It may be advantageous to heat the resulting novel film element at elevated temperatures, in general from 50° to 200° C., preferably about 100°–150° C., directly after transfer of the monomolecular films from the water surface onto the substrate. The heating process as such may last, for example, for from a few minutes to a few hours, depending on the type and thickness of the novel film element. As a result of the heating step following the production of the novel film elements, the properties of the said elements can be stabilized or varied in a specific manner.

The Examples which follow illustrate the invention. In the Examples, parts and percentages are by weight, unless stated otherwise.

Synthesis of the polymethacrylates

Atactic polyoctadecyl methacrylate, homopolymer and copolymers, were prepared in a conventional manner by free radical polymerization in toluene at from 60° to 80° C. using azobisisobutyronitrile as a free radical initiator. After the polymerization, the polymer was worked up by precipitation in methanol and purified by repeated reprecipitation from toluene in methanol. The polymer was finally dried at room temperature under reduced pressure.

Isotactic polyoctadecyl methacrylate, homopolymer and copolymers, was obtained by anionic polymerization using phenylmagnesium bromide as an initiator (by the process due to W. E. Goode et al., J. Pol. Sc. 46 (1960), 317 and 47 (1960), 75. Working up was similar to that for the atactic polymer.

Synthesis of the polypeptides

1. Copolycondensate of γ-methyl L-glutamate and γ-stearyl L-glutamate

Poly-γ-methyl L-glutamate was prepared from the N-carboxyanhydride compound of the ω-methyl ester of L-glutamic acid by polymerization with triethylamine in dioxane as an initiator at room temperature. The N-carboxyanhydride compound was prepared by phosgenation of the ω-methyl ester of L-glutamic acid in dioxane (J. L. Houben, A. Fissi, D. Baccrola, N. Rosato, O. Pieroni and F. Ciardelli, Int. J. Biol. Macromol. 5 (1983), 94). The degree of stearyl substitution (35% of stearyl radicals) was determined by elemental analysis.

The copolycondensate was prepared from poly-γ-methyl L-glutamate by reaction with stearyl alcohol at 60° C. The catalyst used was p-toluenesulfonic acid (J. Watanabe, Y. Fukuda, R. Gehani and I. Nematyu, Macromolecules 17 (1984), 1004). The molecular weight (12,000) was determined by GPC using polystyrene as a standard.

2. Poly(γ-stearyl L-glutamate)

The homopolymer was prepared in the same way as poly-γ-methyl L-glutamate. The ω-stearyl ester of L-glutamic acid was prepared from L-glutamic acid and stearyl alcohol in tert-butanol at 80° C. using concentrated sulfuric acid as the catalyst (Neth. Appl. 6, 500, 089, July 7, 1965; CA 64, 2,159 g (1966)).

| Molecular weights of the polymers: | $\overline{M_n} \times 10^3$ | |
|---|---|---|
| Atactic polyoctadecyl methacrylate | 7.2 | |
| Atactic copolymer of octadecyl methacrylate and dodecyl methacrylate | 8 | (13 primary mol % of dodecyl methacrylate) |
| Isotactic copolymer of octadecyl methacrylate and hexadecyl methacrylate | 8 | (5 primary mol % of hexadecyl methacrylate) |
| Isotactic polyoctadecyl methacrylate | 7 | |
| Isotactic polyoctadecyl methacrylate | 15 | |
| Poly(-Y-octadecyl L-glutamate) | 3* | |
| Copolycondensate of γ-octadecyl L-glutamate and γ-methyl L-glutamate | ≈12* | (35% of octadecyl groups) |

*From GPC, based on polystyrene

EXAMPLE 1

100 μl of a 0.1% solution of the isotactic copolymer of 95 primary mol % of octadecyl methacrylate and 5 primary mol % of hexadecyl methacrylate in chloroform (Uvasol quality) were spread on the water surface of a Lauda Langmuir film balance by the conventional method at 28° C. After the solvent had been evaporated, the film was compressed until the surface pressure was 15 mN/m. The film was stabilized under this pressure (about 1 hour). When the surface area occupied was constant, a small quartz plate which had been rendered hydrophobic with hexamethyldisilazane was immersed vertically by the Langmuir-Blodgett method and pulled up at a speed of 50 mm/min. The first film was transferred while the plate was being pulled up but the next film was transferred as early as during immersion (Y transfer). Transfer in the next cycles was monitored by means of a chart recorder. The pauses set were as follows: immersion in 34 seconds, out of water in 68 seconds. In this way, it was possible to apply not less than 49 films with a constant transfer ratio.

COMPARATIVE EXAMPLE 1

The procedure described in Example 1 was followed, except that the polymer was an isotactic poly(octadecyl methacrylate) which had virtually no side chain nonuniformity and had the same molecular weight. This resulted in a rapidly decreasing Z-type transfer.

COMPARATIVE EXAMPLE 2

The procedure described in Comparative Example 1 was followed, except that the temperature was 32° C. and the pressure 30 mN/m. The result was a Z-type decreasing transfer.

EXAMPLE 2

The procedure described in Example 1 was followed, except that the polymer used was atactic poly(octadecyl-co-dodecyl methacrylate) (13 primary mol % of dodecyl units). The temperature was 25° C. and the pressure 11 mN/m. The result was initially a Z-type transfer which became a Y transfer with constant transfer ratio.

EXAMPLE 3

The procedure described in Example 1 was followed, except that the substrate used was a gold film applied to glass by vapor deposition, and the pressure was 10 mN/m. Y transfer resulted. It was possible to transfer not less than 49 films with constant transfer ratio.

COMPARATIVE EXAMPLE 3

The procedure described in Example 1 was followed, except that the polymer used was an atactic poly(octadecyl methacrylate) and the pressure was 10 mN/m. The result was virtually no transfer.

EXAMPLE 4

The procedure described in Example 1 was followed, except that the polymer used was a copolycondensate of γ-methyl L-glutamate and γ-octadecyl L-glutamate, the temperature was 20° C. and the pressure was 25 mN/m. The result was 100% transfer of up to 200 films or more.

COMPARATIVE EXAMPLE 4

The procedure described in Example 4 was followed, except that the polymer used was the homopolymer poly(γ-octadecyl L-glutamate). The result was a rapidly decreasing Y transfer.

COMPARATIVE EXAMPLE 5

The procedure described in Comparative Example 4 was followed, except that the temperature was 30° C. A decreasing transfer from about the 15th film onward resulted.

We claim:

1. A process for the production of thin films of organic polymers having long-chain side groups on a solid base material, the organic polymer being dissolved in an organic solvent, the solution being spread at a water/air interface by the Langmuir-Blodgett technique and the film being transferred onto a solid base material after evaporation of the organic solvent, wherein organic polymers which contain long-chain n-alkyl side groups bonded to the main chain of the polymer exclusively via

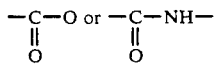

groups are used as the organic polymers having long-chain side groups, and in which some of these long-chain n-alkyl side groups are replaced by shorter-chain n-alkyl side groups, by branched alkyl side groups having the same number or a smaller number of carbon atoms as the main chain or by equally long or shorter side groups having one or more C—C multiple bonds, wherein the organic polymer used is a copolymer of (a) polymerized units of an ethylenically unsaturated compound containing n-alkyl ester groups, where the alkyl radical of the ester group is of not less than 12 carbon atoms, and (b) polymerized units of one or more further ethylenically unsaturated compounds which differ from (a) and contain alkyl ester groups, the alkyl radical of the ester groups having a smaller number of carbon atoms than that of (a), being branched or containing one or more C—C multiple bonds, or the organic polymer used is a polycondensate which contains two or more different ester or ether side groups, one of the ester or ether groups having an alkyl radical with a smaller number of carbon atoms, a branch or one or more C—C multiple bonds, which polycondensate has a helical structure.

2. The process of claim 1, wherein the organic polymer used is a copolymer which contains alkyl acrylates or methacrylates as copolymerized alkyl ester-containing polymerizable ethylenically unsaturated compounds.

3. The process of claim 1, wherein the copolymer contains, as copolymerized component (a), an ester of (meth)acrylic acid where the n-alkyl radical of the ester group is of 16 to 36 carbon atoms.

4. The process of claim 1, wherein the copolymer contains, as copolymerized component (b), an ester of (meth)acrylic acid where the alkyl radical of the ester group is of 6 to 16 carbon atoms.

5. The process of claim 1, wherein the copolymer contains, as copolymerized component (b) an ester of (meth)acrylic acid where the alkyl radical of the ester group is shorter than the n-alkyl radical of the ester group of component (a) by 4 or more carbon atoms.

6. The process of claim 1, wherein the copolymer used as the organic polymer has a degree of polymerization of from 10 to 200.

7. The process of claim 1, wherein the copolymer used as the organic polymer is isotactic.

8. The process of claim 1, wherein the organic polymer used is a copolymer of octadecyl (meth)acrylate as component (a) and an alkyl (meth)acrylate, where alkyl is of 6 to 16 carbon atoms, as component (b).

9. The process of claim 1, wherein the copolymer used as the organic polymer contains from 50 to 99.5 mol % of component (a) and from 0.5 to 50 mol % of component (a) and from 0.5 to 50 mol % of component (b) as copolymerized units.

10. The process of claim 1, wherein the organic polymer used is a polycondensate of copolyglutamates having different alkyl substituents in the γ-position.

11. The process of claim 1, wherein the polycondensate used is a copolycondensate of γ-alkyl' L-glutamate and γ-alkyl L-glutamate, wherein alkyl is an alkyl radical of 1 to 6 carbon atoms and alkyl' is an alkyl radical of 12 to 36 carbon atoms.

12. The process of claim 1, wherein the polycondensate used is a copolycondensate of γ-methyl L-glutamate and γ-octadecyl L-glutamate.

13. The process of claim 1, wherein application of the thin films onto the solid base material is followed by a heating process.

* * * * *